(12) United States Patent
Pfaller et al.

(10) Patent No.: US 6,389,658 B1
(45) Date of Patent: May 21, 2002

(54) CLIP FOR MOUNTING OBJECTS ON A WALL STUD

(75) Inventors: Mark Jerome Pfaller, Memphis, TN (US); Mark Anthony Bailey, Senatobia, MS (US)

(73) Assignee: Thomas & Betts International, Inc., Sparks, NV (US)

( * ) Notice: Subject to any disclaimer, the term of this patent is extended or adjusted under 35 U.S.C. 154(b) by 0 days.

(21) Appl. No.: 09/560,601

(22) Filed: Apr. 28, 2000

Related U.S. Application Data

(60) Provisional application No. 60/132,576, filed on May 5, 1999.

(51) Int. Cl.[7] ............................ F16M 13/00; F16B 2/24; A47B 96/06; H02G 3/00
(52) U.S. Cl. .................. 24/545; 24/295; 248/217.2; 248/906; 220/3.9
(58) Field of Search ..................... 24/545, 292, 294, 24/295, 570; 248/205.1, 217.1, 217.2, 906, 27.1; 220/3.9, 3.3, 3.6, 3.92; 52/220.1, 221

(56) References Cited

U.S. PATENT DOCUMENTS

| 3,248,765 A | | 5/1966 | Achabal et al. |
| 3,606,223 A | * | 9/1971 | Havener .................. 220/3.9 X |
| 3,780,209 A | | 12/1973 | Schuplin |
| 3,963,204 A | | 6/1976 | Liss |
| 3,977,640 A | | 8/1976 | Arnold et al. |
| 4,039,135 A | | 8/1977 | Schenk |
| 4,140,293 A | * | 2/1979 | Hansen .................... 248/217.2 |
| 4,183,486 A | | 1/1980 | Esoldi |
| 4,214,668 A | | 7/1980 | Neff et al. |
| 4,971,280 A | | 11/1990 | Rinderer |
| 5,004,199 A | | 4/1991 | Suk |
| 5,263,676 A | | 11/1993 | Medlin, Jr. et al. |
| 5,288,041 A | | 2/1994 | Webb |
| 5,408,045 A | * | 4/1995 | Jorgensen et al. ............ 174/58 |
| 5,833,110 A | | 11/1998 | Chandler et al. |
| 5,841,068 A | | 11/1998 | Umstead et al. |

FOREIGN PATENT DOCUMENTS

| FR | 2 175 697 | 8/1995 |
| JP | 10-68187 | 3/1998 |

\* cited by examiner

Primary Examiner—Robert J. Sandy
(74) Attorney, Agent, or Firm—Hoffmann & Baron, LLP

(57) ABSTRACT

A clip for mounting an object such as an electrical box on a stud is provided which comprises a fist side portion for engaging a first surface of the stud; a second side portion for engaging a second surface of the stud; the second side portion including at least one box clip arm for securing the electrical box to the clip; and at least one support member extending between the electrical box and the second surface of the stud for substantially preventing flexing of the clip and inward movement of the electrical box when a force is applied generally inwardly of the electrical box.

19 Claims, 4 Drawing Sheets

CLIP FOR MOUNTING OBJECTS ON A WALL STUD

CROSS-REFERENCE TO RELATED APPLICATIONS

This application claims priority under 35 U.S.C. §119(e) to provisional patent application Ser. No. 60/132,576 filed May 5, 1999, entitled "Clip For Attachment To A Metal Or Wood Stud," the entire disclosure of which is incorporated herein by reference.

FIELD OF THE INVENTION

The present invention relates generally to the art of support clips and brackets and, more particularly, to such clips or brackets for mounting devices, equipment or the like on wall studs. In even greater particularity, the present invention is directed to a one-piece tip sheet metal clip for mounting electrical boxes and other objects on metal or wood wall studs, the clip including at least one support member which extends between the electrical box and the webbing of the stud to provide support for the box against inward flexing of the clip when force is applied inward of the box.

BACKGROUND OF THE INVENTION

In mounting electrical boxes or the like on wall studs, it is desirable to provide support to the electrical box to counter any flexing of the mounting means experienced as a result of inward force on the box. Some designs typically omit the extra needed support altogether. Some designs incorporate a looping design which causes the clip to be more flimsy. These drawbacks can be extremely frustrating when attempting to complete electrical connections in the field. Accordingly, in view of the foregoing drawbacks with currently available clips, an improved clip for mounting objects on a wall stud is needed to overcome difficulties in support during installation and to provide benefits of costs and reliability.

SUMMARY OF THE INVENTION

Among the several objects of the present invention may be noted the provision of an improved one-piece sheet metal clip for mounting electrical boxes and other objects on metal or wood wall studs which includes at least on support member extending between the electrical box and the webbing of the stud to provide support for the box against flexing of the clip when force is applied inward of the box; the provision of such a clip which is easy to handle; the provision of such clip which has added versatility in that it may be used in several different ways to secure electrical boxes or the like to wall studs; and the provision of such clip which is of economical manufacture.

It is also an object of the present invention to provide such a clip that is selectively mountable to either the open or closed side of a channel-shaped metal wall stud.

It is another object of the present invention to provide such a clip having stud gripping barbs or prongs in optimum location and spacings.

The clip of the present invention is particularly applicable in mounting electrical boxes and the like to the closed side of a channel-shaped metal wall stud. However, it will be appreciated that the invention has broader aspects, and that the clip can be used for mounting electrical boxes and the like to other types of studs.

In one embodiment of the present invention, a clip for mounting an object such as an electrical box on a stud is provided which comprises a first side portion for engaging a first surface of the stud; a second side portion for engaging a second surface of the stud wherein the second side portion also includes at least one box clip arm for securing the electrical box to the clip. The clip further includes at least one support member extending between the electrical box and the second surface of the stud for substantially preventing flexing of the clip and inward movement of the electrical box when a force is applied generally inwardly of the electrical box. The support member may project from a distal end of the second side portion of the clip toward the second surface of the stud and may further include a turned lip portion for engaging the second surface of the stud. Preferably, the clip includes a pair of support members extending between the electrical box and the second surface of the stud for substantially preventing flexing of the clip and inward movement of the electrical box when a force is applied generally inwardly of the electrical box. The first side portion includes a first pair of prongs having pointed tips for gripping the first surface of the stud. The second side portion includes a second pair of prongs having pointed tips for gripping the second surface of the stud. Preferably, the second side portion includes a pair of box clip arms for securing the electrical box to the clip. The pair of box clip arms and the second side portion cooperate to define a channel means for receiving a side wall of the electrical box. The stud may be comprised a metal stud and the clip may be attached to a closed side of the metal stud.

In another embodiment of the present invention, a clip for mounting an object such as an electrical box on a stud is provided which comprises a first side portion for engaging a first surface of the stud; a second side portion for engaging a second surface of the stud; the second side portion including at least one box clip arm for securing the electrical box to the clip; and support means extending between the electrical box and the second surface of the stud for substantially preventing flexing of the clip and inward movement of the electrical box when a force is applied generally inwardly of the electrical box.

In yet another embodiment of the present invention, a one-piece clip for mounting an object such as an electrical box on a metal stud of generally channel shape having a web, a pair of generally parallel flanges and inwardly turned lips on the flanges, is provided comprising a first side portion for engaging one of the lips for securement of the clip to the stud; a second side portion for engaging the web of the stud for securement of the clip to the stud; the second side portion including at least one box clip arm for securing the electrical box to the clip; and at least one support member extending between a side wall of the electrical box and the web of the stud for substantially preventing flexing of the clip and inward movement of the electrical box when a force is applied generally inwardly of the electrical box. The support member may project from a distal end of the second side portion of the clip toward the web of the stud. The support member may also include a turned lip portion for engaging the web of the stud when the force is applied to the electrical box. Preferably, the clip includes a pair of support members extending between the side wall of the electrical box and the web of said stud. The second side portion preferably includes a pair of box clip arms for securing the electrical box to the clip. The pair of box clip arms and the second side portion cooperate to define a channel means for receiving the side wall of the electrical box wherein the clip is preferably attached to a closed side of the metal stud.

These and other objects, features, and advantages of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to a specific preferred embodiment(s) thereof which is/are illustrated in the appended drawings. Note particularly that the appended drawings are not necessarily drawn to scale. Understanding that these drawings depict only typical embodiments of the invention and are not therefore to be considered to be limiting of its scope, the invention and its presently understood best mode for making and using the same will be described and explained with additional specificity and detail through the use of the accompanying drawings in which.

DETAILED DESCRIPTION

Figure 1:
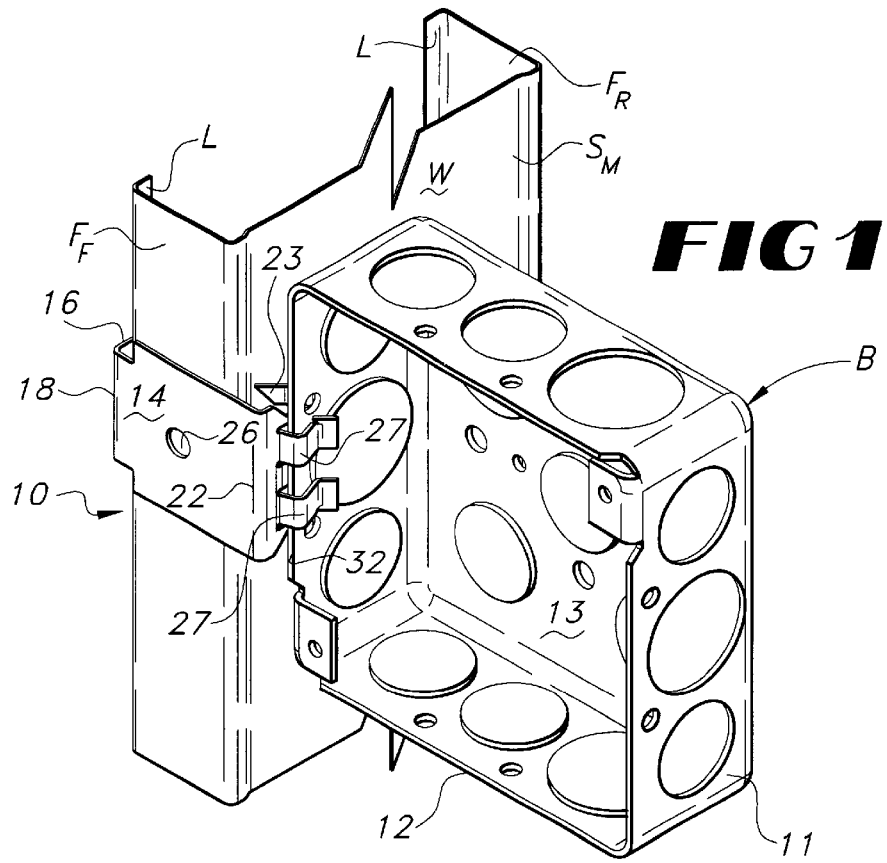
FIG. 1 is a perspective view of a clip shown mounting an electrical box to a closed side of a channel metal wall stud, embodying features of the present invention.
Figure 2:
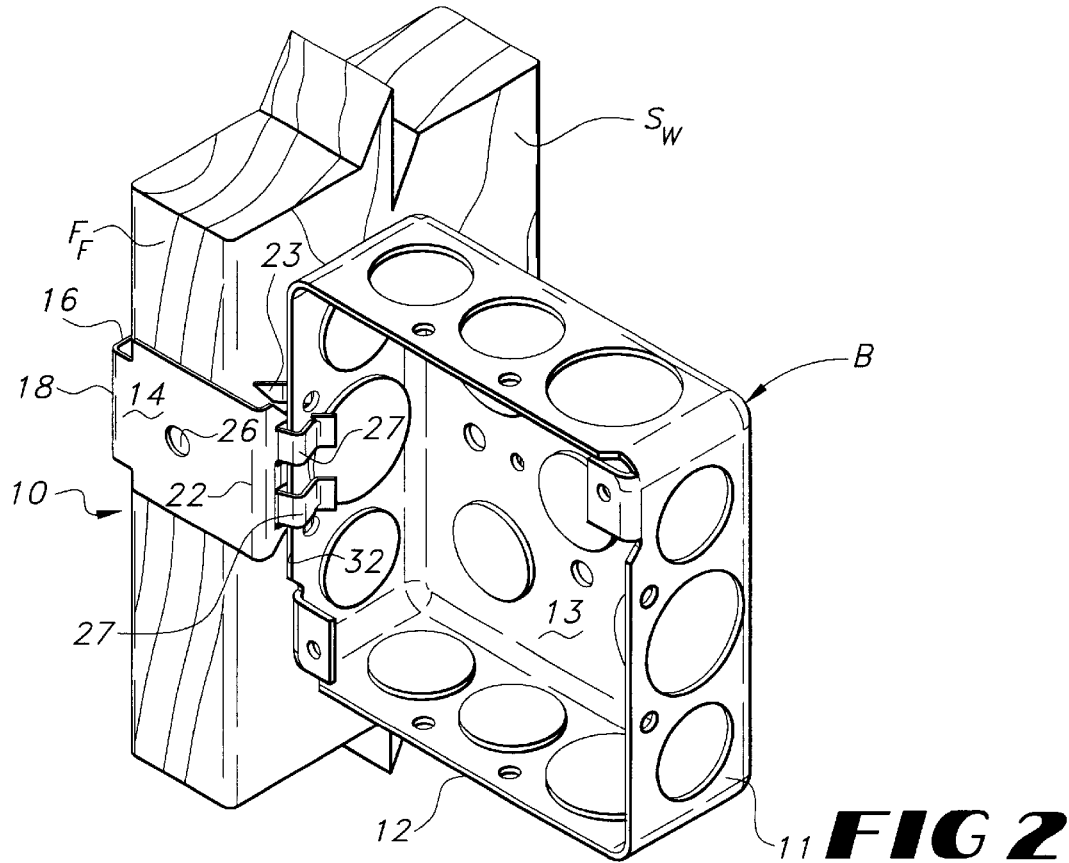
FIG. 2 is a perspective view of the clip of FIG. 1 shown mounting an electrical box to a wooden stud having a rectangular cross-section, embodying features of the present invention.

Referring to the drawings, a representative one-piece sheet metal clip for mounting an electrical box B and other objects on metal $S_M$ or wood $S_W$ wall studs, embodying various features the present invention, is generally indicated throughout the figures by reference character 10. Electrical box B is of a conventional type, and includes a generally rectangular peripheral side wall 11 having an open front end 12, and a rear end that is closed by a rear wall 13. The metal wall stud $S_M$ illustrated in FIG. 1 is of generally channel shape having a web W surface at the closed side of the stud, and a pair of generally parallel opposing flange surfaces extending laterally outwardly and perpendicular from the web W surface. One flange $F_F$ constitutes a front flange at the front of the stud and the other flange $F_R$ constitutes a rear flange at the rear of the stud. Inwardly turned lip L surfaces are located at the outer edges of the flanges. The width of the flanges frequently varies from one manufacturer to another. In addition, the width of the lips L may also vary. While a metal stud is shown in FIG. 1, it will be understood that clip 10 of the present invention is also adapted for use with a conventional wood stud $S_W$ of rectangular cross section, as illustrated in FIG. 2, which has a front face $F_F$ at the front of the stud and a rear face $F_R$ (not shown) at the rear of the stud. Also, for purposes of disclosure, the below discussion of clip 10, when applicable, relates to both the metal stud $S_M$ and the wood stud $S_W$.

For economical manufacture, clip 10 is stamped from a flat sheet metal blank (FIG. 4), preferably heat-treated and spring-tempered steel, and is bent and integrally formed in accordance with a main bending profile so as to accommodate different wall stud sizes. As shown in FIG. 1, clip 10 is engageable with the front flange $F_F$ surface of the stud $S_M$ in a conventional manner for securing the clip 10 to the stud. Clip 10 includes a middle portion 14, a first side portion 16 and a second side portion 17. The first side portion 16 extends generally upwardly, as viewed in FIG. 3, from the left edge 18 of the middle portion 14. At least one barb or prong 19, preferably a first pair of barbs or prongs 19, extend downwardly from the first side portion 16 and terminate at pointed tips 21. The prongs 19 are bent so that they also project inwardly with respect to the middle portion 14. Similarly, the second side portion 17 extends generally upwardly, as viewed in FIG. 3, from the right edge 22 of the middle portion 14. At least one barb or prong 23, preferably a second pair of barbs or prongs 23, extend downwardly from the second side portion 17 and terminate at pointed tips 24. The prongs 23 are bent so that they also project inwardly with respect to the middle portion 14.

The lateral separation of the pointed tips 21, 24 of the first and second pair of prongs 19, 23 is sufficiently predetermined, typically less that the lateral width of the stud $S_M$, 50 that the pointed tips 21 of the first pair of prongs 19 are engageable with the lip L surface and the pointed tips 24 of the second pair of prongs 23 are engageable with the web W surface so that the prongs 19, 23 grip the stud $S_M$ to secure the clip 10 onto the front flange $F_F$ surface of the stud $S_M$. Clip 10 may be further secured to the stud $S_M$ by a fastener (not shown) such as a nail or screw received through a hole 26 in the middle portion 14 of the clip 10 and piercing the front flange $F_F$ surface.

Figure 3:
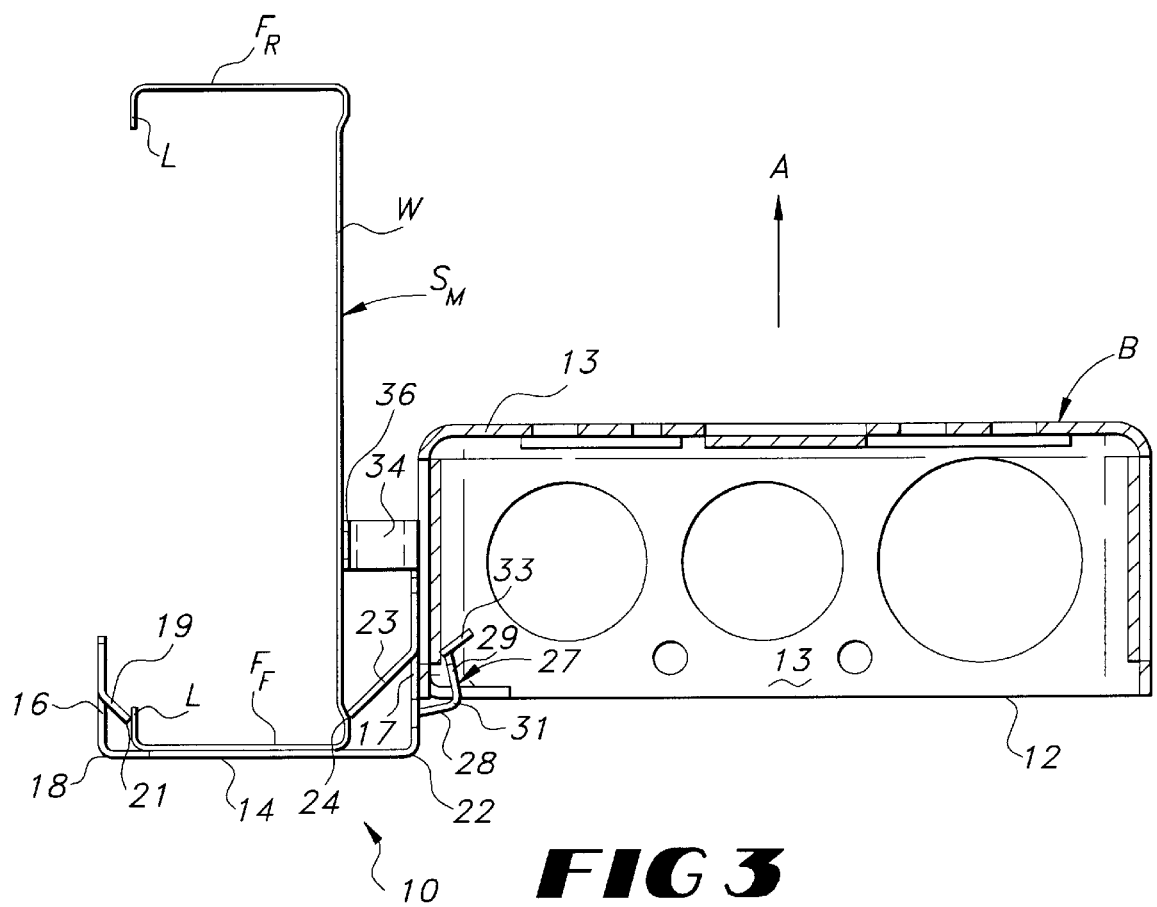
FIG. 3 is a top plan view of the clip of FIG. 1, shown mounting an electrical box, in cross-section, to a closed side of a channel-shaped metal wall stud, embodying features of the present invention.
Figure 4:
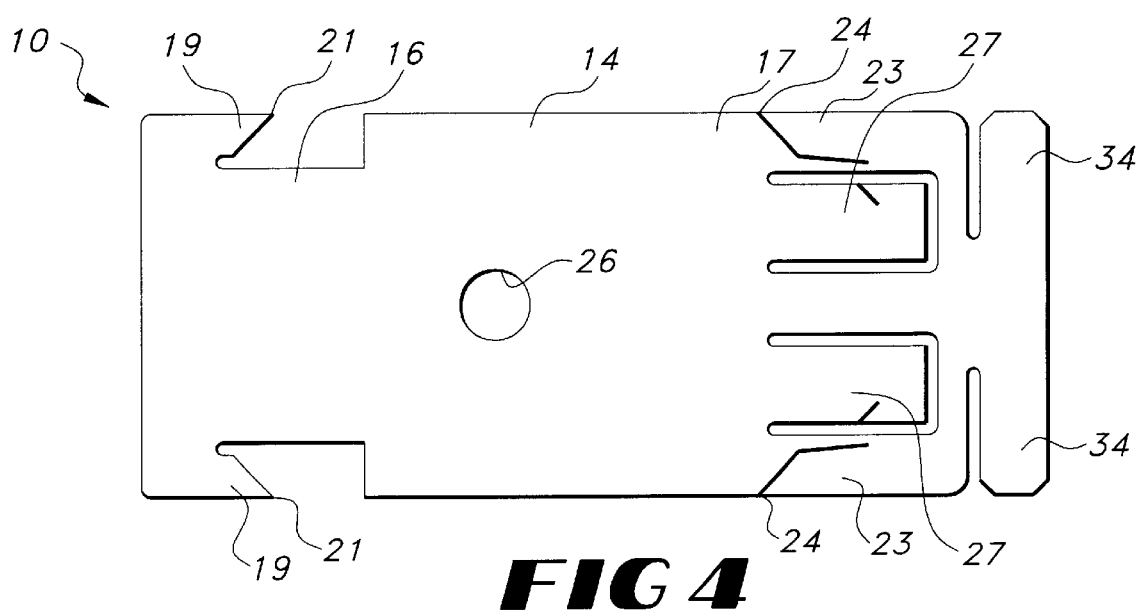
FIG. 4 is a view of the clip of FIG. 1 in a flat configuration before bending, embodying features of the present invention.

Extending generally upwardly from near the right edge 22 of the middle portion 14 on the second side portion 17, as viewed in FIG. 3, is a pair of box clip arms, generally indicated at 27. The box clip arms 27 include an angled portion 28 projecting slightly upwardly and laterally outwardly from the second side portion 17 of the clip 10, and a clip portion 29 extending upwardly and slightly laterally inwardly from a lower edge 31 of the angled portion 28. The box clip arms 27 and the second side portion 17 cooperate to form a channel means which is adapted to receive a front edge 32 of the side wall 11 of the electrical box B. At least one barb or prong 33, preferably a third pair of barbs or prongs 33 having pointed tips, project inwardly and downwardly, as viewed in FIG. 3, from clip portions 29 of box clip arms 27. The separation of these tips of the prongs 33 and the second side portion 17 of clip 10 is preferably less than the thickness of the side wall 11 of the electrical box B so that the tips of the prongs 33 resiliently engage the side wall 11 of the electrical box B when it is received in the channel means between the box clip arms 27 and the second side portion 17 for securing the box B in a fixed position.

At least one support member 34 projects generally laterally inwardly, as viewed in FIG. 3, from the distal end of the second side portion 17 preferably all the way to the web W surface of the stud $S_M$. In a preferred embodiment, clip 10 utilizes a pair of support members 34. Each support member 34 includes an inwardly or outwardly turned lip portion 36 for engaging the web W surface during operation. When the clip 10 is attached to the stud $S_M$ and the electrical box B is clipped onto the clip 10, as shown in FIGS. 1–3, the support members 34 extend between side wall 11 of the electrical box B and the webbing W surface of the stud $S_M$ to provide support for the box B when a force is applied inward of the box B, in the direction of arrow A (FIG. 3), against flexing of the clip 10. When an inward force is applied in the direction of arrow A, the second side portion 17 engages the side wall 11 of the electrical box B while the turned lip portions 36 of the support members 34 engage the webbing W surface. This provides support against and substantially prevents any or further laterally inward movement of the box B.

While the clip 10 is shown attached to the closed side of the stud $S_M$ it should be understood that the length of the support members 34 may be adjusted to accommodate attachment of the clip 10 to the open side of the stud $S_M$. Furthermore, support members 34 may be utilized and function substantially the same when clip 10 is attached to a wood stud $S_W$.

Although a preferred embodiment(s) of the present invention has been described above by way of example, it will be understood by those skilled in the field that modifications may be made to the disclosed embodiment(s) which are within the scope of the invention as defined by the appended claims.

What is claimed is:

1. A clip for mounting an object such as an electrical box on a stud, said clip comprising:
   (a) a first side portion including a first pair of prongs having pointed tips for gripping said first surface of said stud;
   (b) a second side portion including a second pair of prongs having pointed tips for gripping said second surface of said stud;
   (c) said second side portion including at least one box clip arm for securing said electrical box to said clip; and
   (d) at least one support member extending between said electrical box and said second surface of said stud for substantially preventing flexing of said clip and inward movement of said electrical box when a force is applied generally inwardly of said electrical box.

2. A clip as defined in claim 1, wherein said at least one support member projects from a distal end of said second side portion of said clip toward said second surface of said stud.

3. A clip as defined in claim 2, wherein said at least one support member includes a turned lip portion for engaging said second surface of said stud.

4. A clip as defined in claim 1, wherein said clip includes a pair of support members extending between said electrical box and said second surface of said stud for substantially preventing flexing of said clip and inward movement of said electrical box when a force is applied generally inwardly of said electrical box.

5. A clip as defined in claim 4, wherein said stud comprises a metal stud.

6. A clip as defined in claim 5, wherein said clip is attached to a closed side of said metal stud.

7. A clip as defined in claim 1, wherein said second side portion includes a pair of box clip arms for securing said electrical box to said clip.

8. A clip as defined in claim 7, wherein said pair of box clip arms and said second side portion cooperate to define a channel means for receiving a side wall of said electrical box.

9. A one-piece clip for mounting an object such as an electrical box on a metal stud of generally channel shape having a web, a pair of generally parallel flanges and inwardly turned lips on the flanges, said clip comprising:
   (a) a first side portion for engaging one of said lips for securement of said clip to said stud;
   (b) a second side portion for engaging the web of said stud for securement of said clip to said stud;
   (c) said second side portion including at least one box clip arm for securing said electrical box to said clip; and
   (d) at least one support member extending laterally between a side wall of said electrical box and the web of said stud for substantially preventing flexing of said clip and inward movement of said electrical box when a force is applied generally inwardly of said electrical box.

10. A one piece clip as defined in claim 9, wherein said at least one support member projects from a distal end of said second side portion of said clip toward the web of said stud.

11. A one-piece clip as defined in claim 10, wherein said at least one support member includes a turned lip portion for engaging the web of said stud when said force is applied to said electrical box.

12. A one-piece clip as defined in claim 11, wherein said clip includes a pair of support members extending between said side wall of said electrical box and the web of said stud.

13. A one-piece clip as defined in claim 12, wherein said second side portion includes a pair of box clip arms for securing said electrical box to said clip.

14. A one-piece clip as defined in claim 13, wherein said pair of box clip arms and said second side portion cooperate to define a channel means for receiving said side wall of said electrical box.

15. A one-piece clip as defined in claim 10, wherein said clip is attached to a closed side of said metal stud.

16. A clip for mounting an electrical box to a stud, comprising:
   a first side portion for engaging a first surface of said stud;
   a second side portion for engaging a second surface of said stud and having a clip arm for securing said box thereto; and
   at least one support member extending laterally between said box and said stud for substantially preventing flexing of said clip and inward movement of said electrical box when force is applied generally inwardly of said electrical box.

17. A clip as defined in claim 16, wherein said at least one support member projects from a distal end of said second side portion of said clip toward said second surface of said stud.

18. A clip as defined in claim 17, wherein said at least one support member includes a turned lip portion for engaging said second surface of said stud.

19. A clip as defined in claim 16, wherein said clip includes a pair of support members extending between said electrical box and said second surface of said stud for substantially preventing flexing of said clip and inward movement of said electrical box when a force is applied generally inwardly of said electrical box.

* * * * *

UNITED STATES PATENT AND TRADEMARK OFFICE
CERTIFICATE OF CORRECTION

PATENT NO. : 6,389,658 B1
DATED : May 21, 2002
INVENTOR(S) : Pfaller et al.

It is certified that error appears in the above-identified patent and that said Letters Patent is hereby corrected as shown below:

Title page,
Item [57] ABSTRACT,
Line 2, reads "...comprises a fist side portion..." should read -- ...comprises a first side portion... --.

Column 1,
Line 17, reads "...a one-piece tip sheet..." should read -- ...a one-piece sheet... --.

Figure 5:
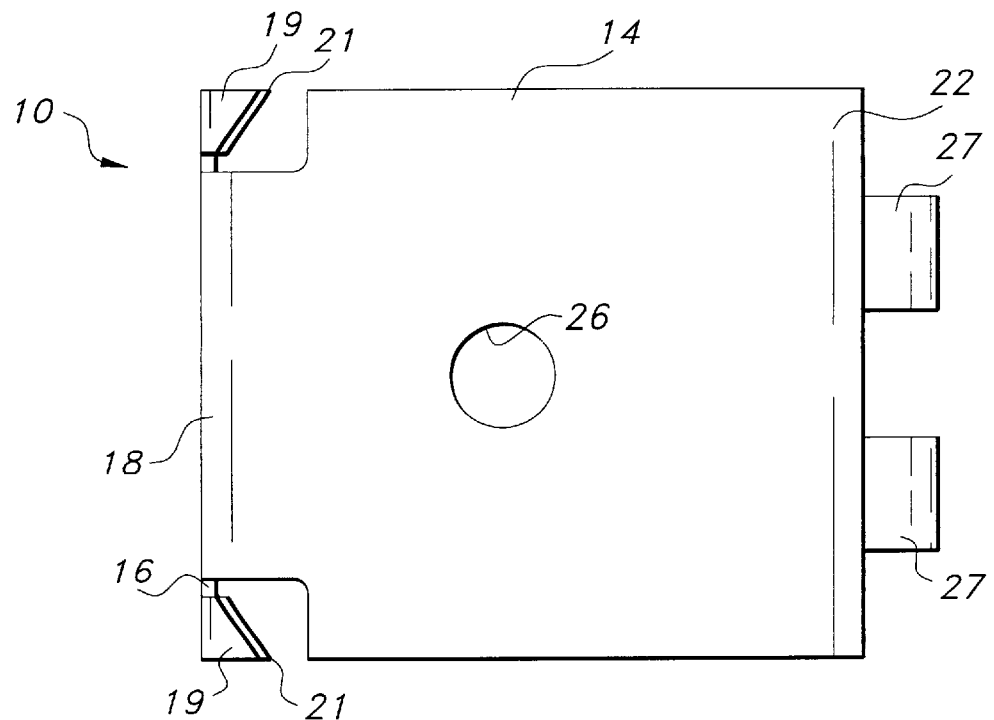
FIG. 5 a front elevational view of the clip of FIG. 1, embodying features of the present invention.
Figure 6:
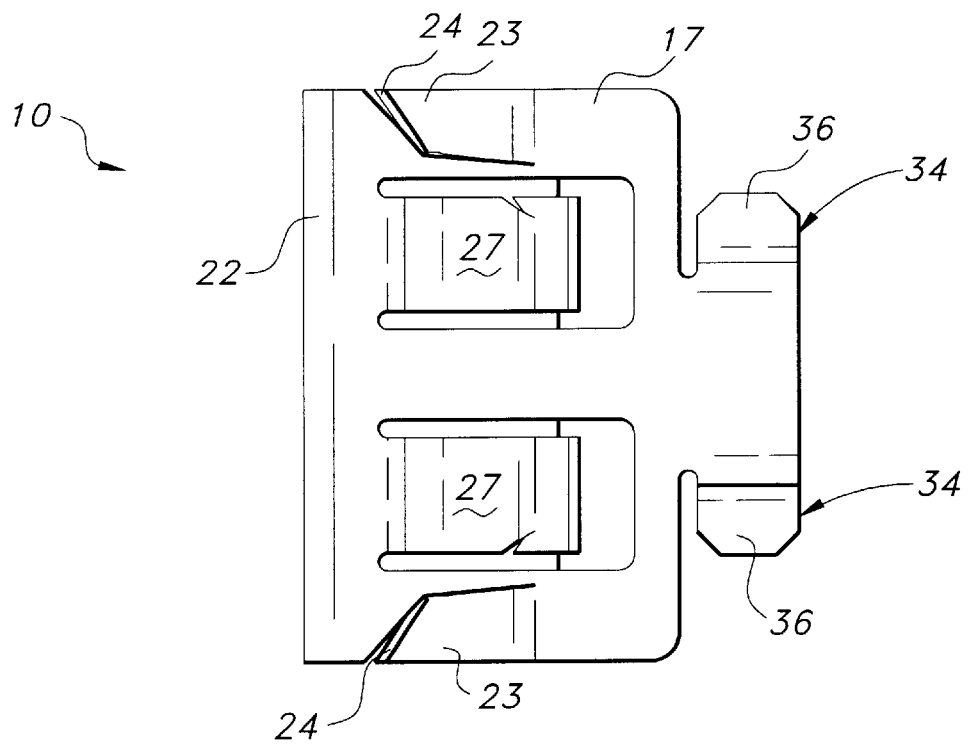
FIG. 6 a right-side elevational view of the clip of FIG. 1, embodying features of the present invention.
Figure 7:
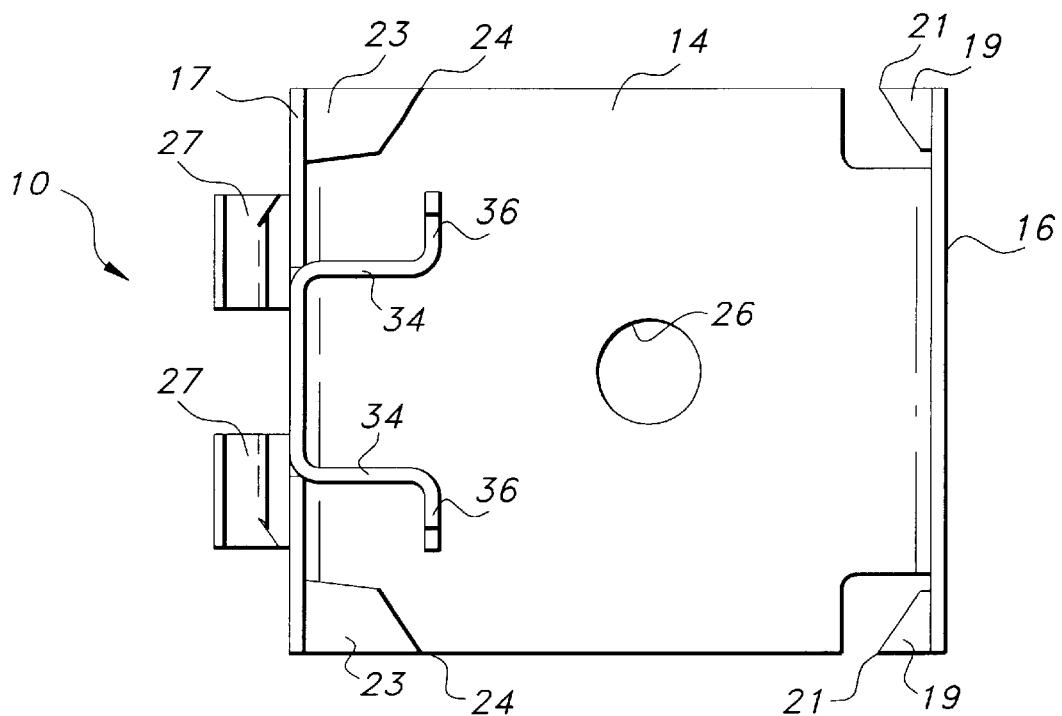
FIG. 7 is a back elevational view of the clip of FIG. 1, embodying features of the present invention.
Figure 8:
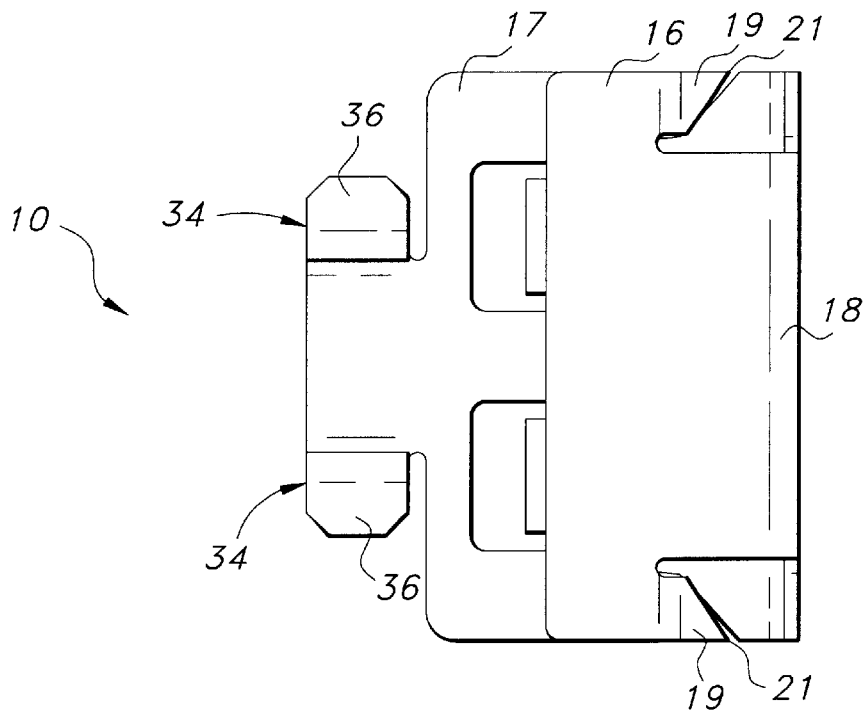
FIG. 8 is a left-side elevational view of the clip of FIG. 1, embodying features of the present invention

Column 3,
Line 21, reads "...of a channel metal..." should read -- ...of a channel-shaped metal... --.
Line 35, reads "FIG. 5 a front elevational..." should read -- FIG. 5 is a front elevational... --.
Line 37, reads "FIG. 6 is a right-side..." should read -- FIG. 6 is a right-side... --.

Column 4,
Line 30, reads "...stud SM, 50 that the..." should read -- ...stud SM, so that the... --.

Signed and Sealed this

Twenty-eighth Day of January, 2003

JAMES E. ROGAN
*Director of the United States Patent and Trademark Office*